Figure 1:
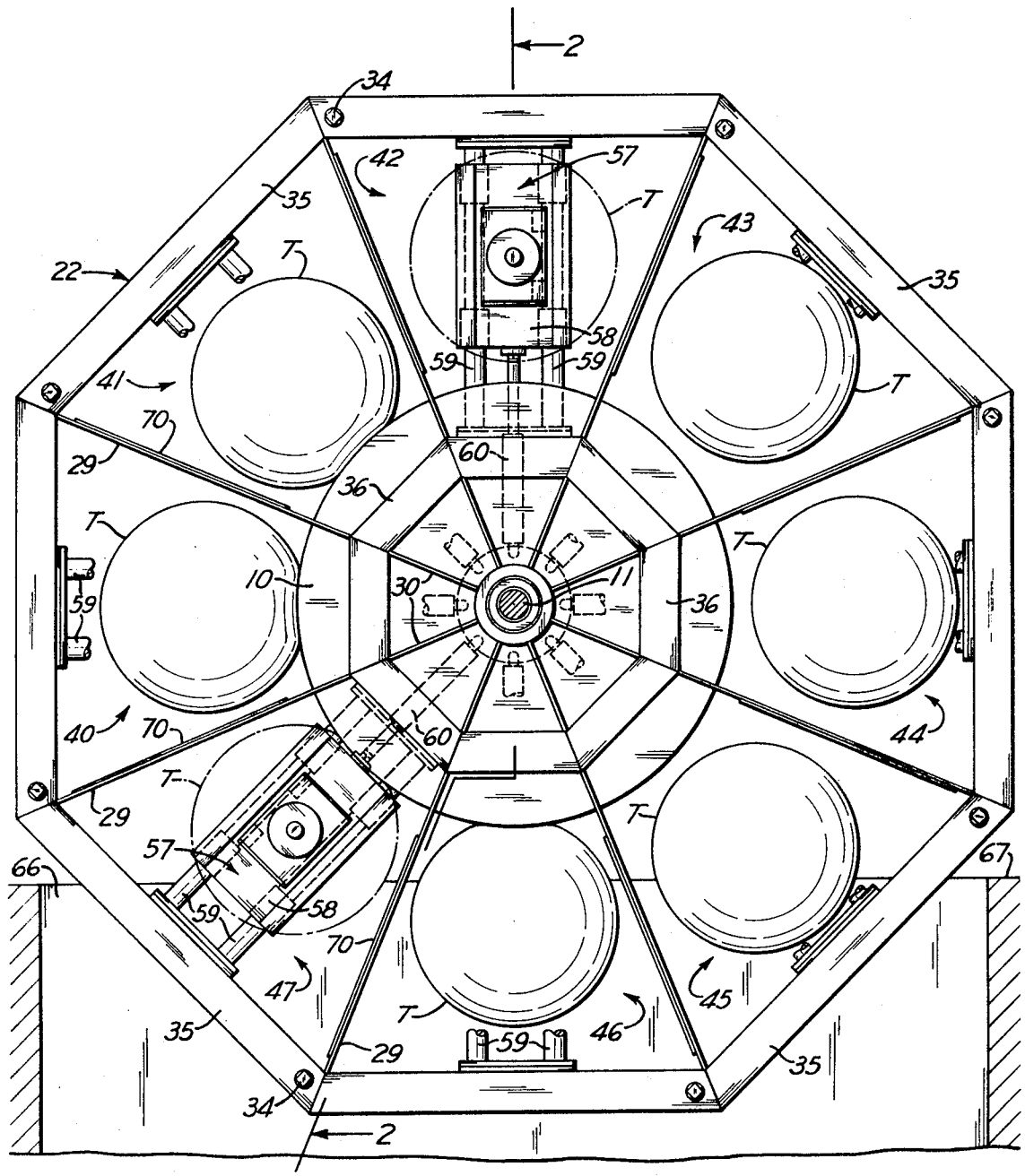

United States Patent [19]

Obarski

[11] 3,726,124
[45] Apr. 10, 1973

[54] TESTING MACHINE FOR TIRES AND THE LIKE

[75] Inventor: Richard W. Obarski, Stow, Ohio

[73] Assignee: United Engineering and Foundry Company, Pittsburgh, Pa.

[22] Filed: Mar. 24, 1971

[21] Appl. No.: 127,488

[52] U.S. Cl. ......................... 73/8, 51/108 R, 73/146
[51] Int. Cl. ............................................... G01n 3/56
[58] Field of Search .................... 73/8, 146; 51/108 R

[56] References Cited

UNITED STATES PATENTS

| | | |
|---|---|---|
| 3,604,245 | 9/1971 | Atelian .................................. 73/146 |
| 3,478,581 | 11/1969 | Sperberg ................................ 73/146 |
| 2,798,376 | 7/1957 | Constantakis ...................... 73/146 X |
| 3,527,091 | 9/1970 | Reus ..................................... 73/146 |

Primary Examiner—Donald O. Woodiel
Assistant Examiner—Daniel M. Yasich
Attorney—Henry C. Westin

[57] ABSTRACT

The disclosure of this invention relates to a testing machine for tires and, more particularly, to such machines capable of simultaneously performing various testing operations on a number of tires wherein the testing pressures are accurately maintained and recorded. The disclosed tire tester includes an upright frame which for a given fly wheel diameter is constructed and arranged to allow for the simultaneous testing of eight ordinary maximum size automobile tires and to provide two convenient loading and unloading stations. This is accomplished, in part, by providing a compact slidable carriage for each of the eight tire stations mounted on stiff rod assemblies extending parallel to the radius of the fly wheel, which carriages fall within the diameters of the maximum tires to be tested and support the tires in a rigid cantilever manner.

5 Claims, 4 Drawing Figures

INVENTOR.
RICHARD W. OBARSKI
BY
Henry C. Westin
ATTORNEY.

TESTING MACHINE FOR TIRES AND THE LIKE

In order to increase the capacity of auto tire testing machines as used by tire manufacturers or others, including governmental agencies, recent machines have provided for the testing of from five to six tires at once. These past machines have more or less been limited to testing no more than six tires because of the fact that the fly wheel used has a given diameter as defined, in part, by the interest of creating accurate simulated road conditions and no feasible way was known of how to increase the capacity in arranging more tires around the fly wheel.

Moreover, in past tire testing machines great difficulty was experienced in designing a system that allowed for the accurate development of the desired testing loads between the tires and the fly wheel and in obtaining an accurate recording thereof. Another limitation of past multiple tire testers was that of providing a procedure for obtaining and maintaining proper contact in the running positions of the tires relative to the fly wheel and for accurately establishing desired steering or camber angles.

One last limitation of previous tire testers, which had to do with the so-called upright or ferris wheel type machines, was the inaccuracies experienced both in the application of the testing loads and in recording them due to the different gravitational loads of the tires and their support means in assuming different angular positions during the testing operation relative to the fly wheel.

It is, therefore, the primary object of the present invention to provide a tire testing machine that will overcome each and every one of the aforesaid disadvantages and limitations along with possessing other advantages.

More particularly, the present invention provides a novel constructed machine capable of testing as many as eight ordinary maximum size auto tires for a fly wheel having a circumference of one three-hundredths of a mile, in which the eight tire stations need only be rotated no more than 135° between two loading and unloading positions. Maximum size tires may approximate diameters of 36 inches.

It is a further object of the present invention to provide a tire testing machine of the type noted above in which each tire station is made up of a very stiff and compact support structure, including a carriage mounted on stiff, relatively frictionless rods extending parallel to the radius of the fly wheel, in which the rods and carriage in a direction perpendicular to their radial planes fall within the diameter of an ordinary maximum size automobile tire and in which the tire is rigidly cantilever carried by the carriage.

It is another object of the present invention to provide a tire tester, such as the type noted above, in which the testing load in each station is developed by a piston cylinder assembly arranged to extend radially of the fly wheel and having its rod end connected to the axle of the carriage that supports a tire to be tested.

It is a still further object of the present invention to provide a tire testing machine, such as the type noted above, in which a load detecting device is mounted at the end of the rod of each piston cylinder assembly in immediate proximity to the tire and the fly wheel.

It is another object of the present invention to provide a control system for accurately applying and recording the testing loads in a manner that gravitational effects will be eliminated.

It is a final object of the present invention to provide an accurate and convenient construction to maintain the tires in the proper position relative to the fly wheel or for establishing a desired steering or camber angle relative to the fly wheel.

Figure 2:
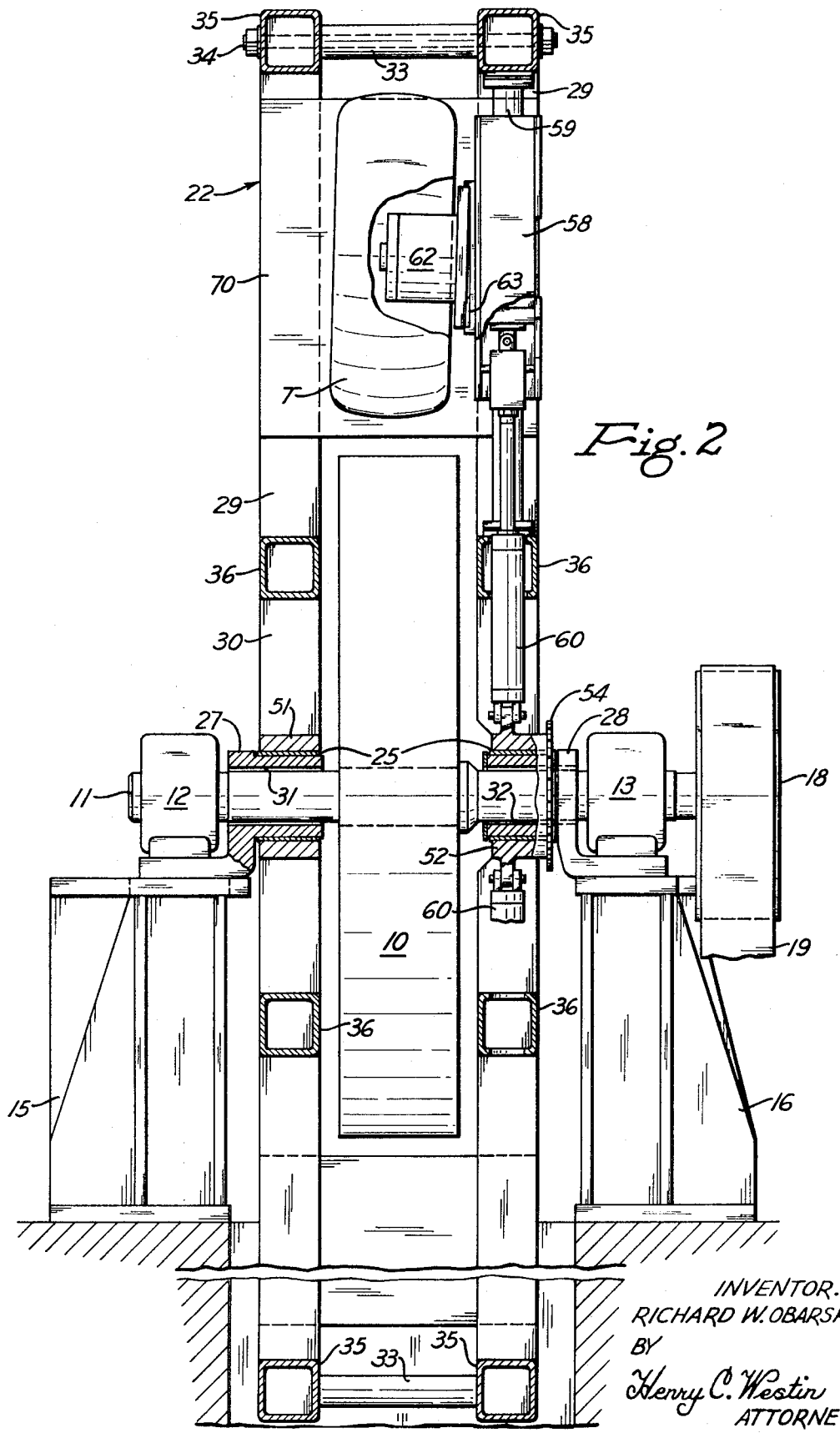
Figure 3:
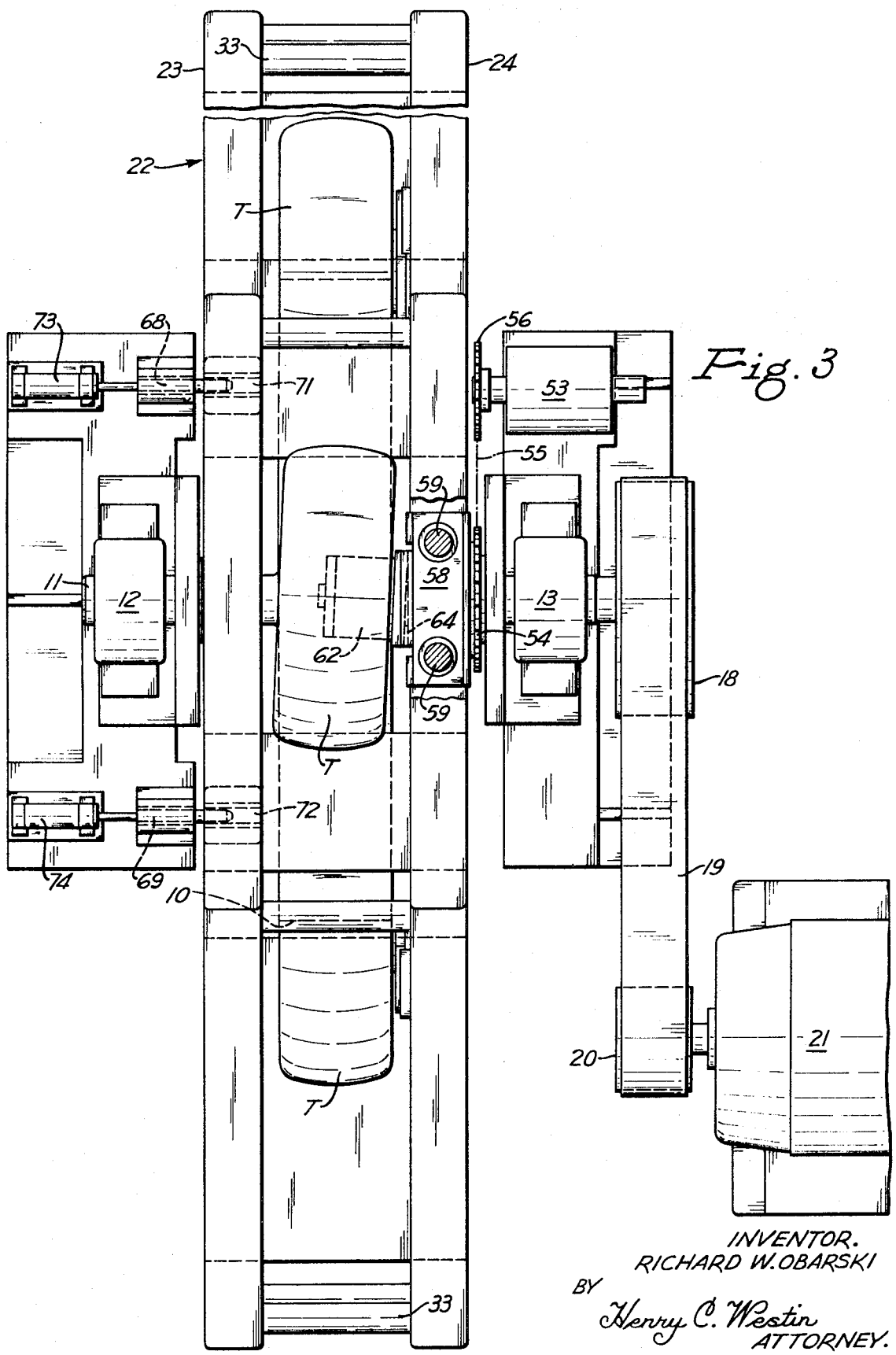
Figure 4:
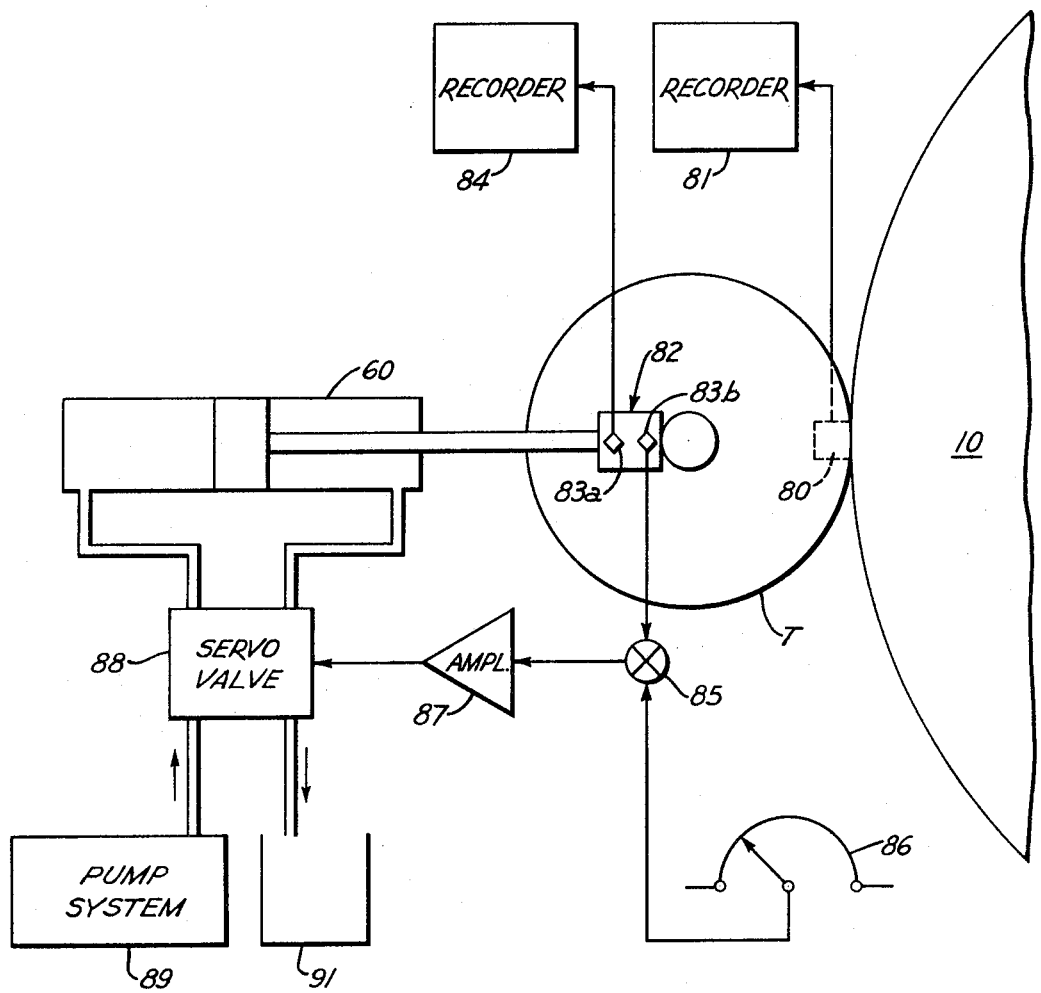

These objects as well as other novel features and advantages of the present invention will be better understood when the following description is read along with the accompanying drawings of which:

FIG. 1 is a side elevational view of an eight-station tire testing machine built in accordance with the teaching of the present invention, FIG. 2 is a vertical sectional view taken on line 2—2 of FIG. 1 illustrating the uppermost tire in a camber position, FIG. 3 is a plane view, partly in section, illustrating the uppermost tire in a steering or yaw position, FIG. 4 is a schematic electrical-hydraulic drawing of the control system for one of the carriages illustrated in FIG. 1.

In referring first to FIGS. 1, 2 and 3, there is illustrated an upright tire testing machine, including a fly wheel 10 supported and rotated by a shaft 11, the shaft, as shown in FIG. 2, supported at its opposite end by bearing blocks 12 and 13 which are supported, in turn, by steel pedestals 15 and 16. The block 12 and the pedestal 15 are arranged on the operator side of the machine, whereas, the block 13 and pedestal 16 are at the drive side thereof.

At the drive side, the shaft 11 is extended where it receives a pulley 18 and a belt 19. The belt, as best shown in FIG. 3, passes around a second pulley 20 connected to an electrical motor 21.

The fly wheel constitutes a very accurately machined steel weldment having a face of approximately 12 inches and a diameter of 67.227 inches which corresponds to a circumference of one three-hundredths of a mile. These last dimensions, according to a well-accepted practice, correspond to a previously set and currently employed Federal governmental standard for laboratory testing of tires.

Encircling the fly wheel 10 is an octagonal shaped structure 22 being made up of two upright frames 23 and 24. The inner portion of the frames have circular openings for receiving bearings 25 for direct support by non-rotatable sleeves 27 and 28 which have outwardly extending portions that serve as base members for the bearing blocks 12 and 13. To provide for the rotations of the shaft 11, clearances 31 and 32 are provided between the shaft 11 and sleeves 27 and 28.

The frames 23 and 24 are rigidly joined together by cross members 33 at their outer extremes which members include connecting bolts 34 that run between square tubular members 35. The inner extremes of the frames are made up of square tubular members 36, but which are not tied together by cross members. As shown in FIGS. 1 and 2 frames 23 and 24 are connected to members 36 by a plurality of radial members 29. The members 36 are, in turn, connected to hubs 51 and 52 by radial members 30, making up the complete frame assemblies. The drive side frame 24 is open at its back, but may be reinforced by a protective covering, if desired; whereas, the operating side frame 23 is open, as shown in FIG. 2, particularly in the areas in which tires are received. These areas, which are defined as testing stations, are eight in number and are identified by reference characters 40 – 47. FIG. 1 shows tires T in each station in engagement with the fly wheel 10.

The structure 22 is rotated about the shaft 11 by a reducer-motor unit 53. As shown in FIGS. 2 and 3, the hub 52 supports a sprocket 54 which receives a driving chain 55 carried by a second sprocket 56 which is mounted on the output shaft of the motor unit 53. While only illustrated in FIG. 1 with respect to stations 42 and 47, each station includes a tire testing carriage 57. Each carriage is made up of a frame 58 having a pair of longitudinal holes into which is mounted free linear motion bearings, such as "Ball Bushings" manufactured by Thomson Industries, Inc. of Manhasset, New York, for receiving spaced-apart guiding rods 59, the rods being arranged parallel to and off-set equal distance from a radial reference plate of the fly wheel 10. By this construction the center of the carriages are coexistent with the radial reference planes in which planes the carriages move toward and away from the fly wheel. It will be observed that the construction of the rods and carriages, together with the cantilever mounting of the tires, provides a very compact rigid tire supporting assembly, wherein the assembly falls within the outer periphery of the maximum size tire, which relationship is illustrated in FIG. 1 with reference to stations 42 and 47. Accordingly, the only limitation as to the number of tires that can be provided for is the size of the tires themselves.

The opposite ends of the rods 59 are rigidly secured to the adjacent members 35 and 36 of the drive side frame 24 to form a very rigid assembly, in addition to allowing ready access to the carriages from the open portions of the frame 23. Also, similarly mounted for each carriage are piston cylinder assemblies 60 having their cylinder ends connected to the hub 52 and their rod ends connected to the innermost portions of the frames 58 of the carriages 57.

The tires are mounted on the carriages by each carriage being provided with a rigid, freely rotatable stud shaft 62 that project towards the vertical center of the structure 22. The proper contact relationship between a tire and the fly wheel 10 is accurately maintained in both the horizontal and vertical planes by shims 63 and 64, respectively, which, as shown in FIGS. 2 and 3, are positionable between the inner face of the stud shaft 62 and the adjacent face of the associate carriage. Depending upon the taper of the shims 63 and 64, a truly straight running condition may be obtained and maintained between the tires and the fly wheel or, if desired, the tires can be angularly positioned a predetermined amount in either the horizontal or vertical plane to obtain a steering or camber running condition. In greatly exaggerated form FIG. 2 illustrates a tire T displaced from the vertical axis of the machine and depicts a camber running condition; whereas, FIG. 3 illustrates a tire T displaced from the horizontal axis and, hence, depicts a steering or yaw running condition.

It is a feature of the present invention to provide for the quick and convenient removal and replacement of the tires from the various stations 40 - 47 between two loading and unloading stations. These stations, illustrated only in FIG. 1, are identified by reference characters 66 and 67. The structure 22 is adapted to rotate through 135 degrees between the two stations 66 and 67 located at floor level. This greatly simplifies the design of the power connections and electrical cables that run to the structure and permits use of a mono-rail conveyor for test wheel and tire inserting and removing system. Also, as will be more fully discussed hereinafter, in view of the different gravitational loading on the stations 40 – 47 each station is preferably assigned a predetermined operating position with respect to the fly wheel, in which the stations will always be brought back to their designated operating positions. The structure 22 is adapted to be held in a proper position for either loading and unloading stations 66 and 67 by retractable positioning pins 68 and 69, seen only in FIG. 3, arranged to register with holes 71 and 72 provided in the operator's side frame 23 for each station 40–47. The pins are advanced and retracted by piston cylinder assemblies 73 and 74 and will also be employed to hold the structure during testing when loading or unloading is not being performed.

As shown in FIG. 1 each structure is provided with the necessary safety, protective partitions 70 which can be attached to the members 29.

In order to eliminate any inaccuracies in obtaining the desired load between the tires and the fly wheel and to obtain the correct load reading, if a record thereof is desired, the gravitational effect of the tires and carriages in view of their angular positions relative to the fly wheel is nullified by independent electrical systems, which also include a procedure for measuring the contact loads of each tire and recording them.

This system for one of the eight tire stations 40 – 47 is illustrated in FIG. 4 where the fly wheel 10, tire T and the piston cylinder assembly 60 are diagrammatically shown. The gravity-nulling system which will be employed for at least some of the stations before the tester is put into operation includes a load reading instrument, such as, an electrical load cell 80 adapted to be arranged between the fly wheel and the tire, the load reading of which is recorded by a portable recorder 81.

A second load reading instrument which can be an electrical or hydraulic load cell 82 is permanently mounted at the outermost end of the piston rod of the piston cylinder assembly 60 having two separate bridge circuits 83a and 83b. The bridge 83a is associated with a permanent recorder 84; whereas, bridge 83b is associated with an electrical control unit 85, such as, a discriminator. The control unit 85 receives a second signal from a manual set potentiometer 86 and discharges a plus, minus or zero signal representing the difference, if any, between the two input signals which signal is sent to an amplifier 87. The amplifier 87 feeds an amplified signal to a servovalve 88 having four ports. The upper ports are connected to the front and back of the piston cylinder assembly 60 while the two lower ports are connected to a pump 89 and sump 91.

Before the tire tester is placed in operation the cell 80 is inserted between a tire mounted on a test wheel and the fly wheel 10 and the weight represented by a plus or minus signal of the tire-wheel assembly and carriage is measured by the cell 80. Assuming that the uppermost tire station 42 is the one being worked on, the full effect of gravity will be read by the cell 80 and recorded by the recorder 81, as compared with the two most adjacent tire stations 41 and 43 where the effect of gravity would be somewhat less and decreasing to a normal value at the two opposed horizontal stations 40 and 44. In order to null out the gravity pull on the uppermost tire station 43, the pointer of the recorder 84 is adjusted an amount equal to the gravity reading of the recorder 81 so that the recorder, in effect, will sum the force of gravity and the cylinder force. When this is done, the recorder 84 will record the actual force at the end of the rod of the piston cylinder assembly 60, as long as the tire station is always brought back to the position as it was in for the nulling operation. The same nulling operation will be performed for each of the eight stations 40 – 47.

In operating the tire tester after the nulling operation has been performed, the potentiometer 86 will be set for the desired load and the control unit 85 will send a plus signal to the servovalve 88 to cause the piston cylinder assembly 60 to bring the tire T into engagement with the rotating fly wheel 10. The cylinder will continue to advance the tire against the fly wheel until the signal of the bridge 83b being sent to the control unit 85 equals the set value of the potentiometer 86, after which the valve will hold the required pressure, or decrease or increase it should conditions require a change. The recorder 84 will continually record the force at the end of the rod of the piston cylinder assembly 60 which for all practical purposes, because of its immediate proximity to the contact point of the tire and fly wheel, will be an accurate reading of the contact load.

After the gravitational nulling operations have been performed, the testing machine is ready to be placed in operation. The stations 40 – 47 may be brought two at a time to one of the two loading stations 66 and 67 for their receipt of tires to be tested. For the preferred size of fly wheel of 62.227 inches diameter, eight tires having a diameter of 32 inches which represent, under present conditions the majority of maximum size tires being tested, which can be quickly mounted on the carriages 57 and brought into their testing positions. If it is desired to test appreciably larger sized tires or other elements, then a seven-station machine can be employed having all the advantages of the eight-station machine, except for the slight loss in capacity.

As noted before, each station 40 – 47 is assigned an operation position so that once the tire is loaded by securing its test wheel to the stud shaft 62, the structure 22 is rotated to position the station in one of the eight positions around the fly wheel. Once in its designated position, the piston cylinder assembly 60 will be operated to move the carriage 57 and its tire T into engagement with the fly wheel 10, the contact loading and recording thereof being automatically controlled as previously described. The testing operation for each tire can start and stop at different times and the machine can be operated with one or more empty stations, since each carriage 57 can be advanced or retracted independently of each other. When one of the stations is in or moving to or from one of the loading and unloading stations 66 and 67, the tire of the other stations can be maintained in contact with the fly wheel since the loading and repositioning can be quickly performed.

It will be appreciated that while an upright type testing machine has been disclosed and described, various features of the present invention can be employed just as well in a tire testing machine where the fly wheel and structure rotate about a vertical axis instead of an horizontal axis. In this case the gravitational loading on the carriages and tires for each station would be substantially the same so that compensation thereof need not be provided. It will also be appreciated that the various features of the present invention can be employed in testing machines for elements other than automotive or tires.

In accordance with the provisions of the patent statutes, I have explained the principle and operation of my invention and have illustrated and described what I consider to represent the best embodiment thereof.

I claim:

1. An apparatus for dynamically testing elements, such as tires and the like, comprising:
   a rotatable fly wheel,
   means for rotating said fly wheel,
   an enclosing structure surrounding said wheel having at least one open side,
   means for rotatably mounting said structure coaxially with said wheel,
   means for dividing said structure into a number of distinct testing stations in which each station has a common side formed by said open side of said structure,
   a carriage arranged in each of said stations,
   means for supporting said carriages in a manner to restrict said carriages to movements in radial directions relative to said wheel, including a pair of spaced-apart guide rods arranged equidistantly from radial reference planes of said wheel,
   means for connecting said rods to said structure on the side opposite said open side thereof,
   each of said carriages and their supporting means arranged to fall within the outer periphery of the element to be tested viewed in a direction perpendicular to the direction of movement of the carriages,
   said carriages including support means for allowing elements to be tested to be mounted on said carriages in a manner that the elements can be brought into contact with said wheel, and
   piston cylinder assembly for causing said carriages to move towards and away from said wheel to thereby bring said elements into and out of contact with said wheel, said piston cylinder assembly being arranged to extend from the innermost side of said carriages towards the center of said wheel and on the side of said structure opposite said open side thereof.

2. An apparatus according to claim 1, including linear motion substantially frictionless bearings arranged between said guide rods and said carriages.

3. An apparatus according to claim 1 including a load sensitive means arranged between each of said piston cylinder assemblies and its associated carriage for measuring the load exerted on said carriage and, hence, the contact loads between the element being tested and said wheel.

4. An apparatus for dynamically testing elements, such as tires and the like, comprising:
   a rotatable fly wheel,
   means for rotating said fly wheel, and enclosing structure surrounding said wheel having at least one open side in which said wheel and structure are arranged to rotate about a common horizontal axis, means for rotatably mounting said structure coaxially with said wheel, means for dividing said structure into a number of distinct testing stations in which each station has a common side formed by said open side of said structure, said stations each having a single and different angular operating position relative to said wheel and in which said means for rotating said structure includes means for rotating said stations between a loading and unloading station and their operating positions, a carriage arranged in each of said stations, means for supporting said carriages in a manner to restrict said carriages to movements in radial directions relative to said wheel, each of said carriages and their supporting means arranged to fall within the outer periphery of the element to be tested viewed in a direction perpendicular to the direction of movement of the carriages, said carriages including support means for allowing elements to be tested to be mounted on said carriages in a manner that the elements can be brought into contact with said wheel, means for causing said carriages to move towards and away from said wheel to thereby bring said elements into and out of contact with said wheel, means for determining gravitational loading of at least one of said carriages having an operating position displaced from a horizontal plane passing through said axis and transmitting a signal proportional thereto to a first measuring means, said determination being made before testing is commenced, means for measuring the load of said one carriage caused by an element to be tested contacting said wheel and transmitting a signal proportional thereto to a second measuring means, and wherein said two signals are combined for producing a modified signal representing the actual load on said one carriage.

5. An apparatus according to claim 2 in which said load measuring means includes means for producing a first and second signal proportional to the load being measured, a recording means for receiving said first signal, a control means for receiving said second signal, said control means receiving a third signal proportional to a desired load between said wheel and said element to be tested, and means controlled by said control means for causing operation of said means for moving said one carriage until any difference between said second and third signals is reduced substantially to zero.

* * * * *